Patented Nov. 17, 1953

2,659,732

UNITED STATES PATENT OFFICE 2,659,732

QUATERNARY AMMONIUM SALTS OF DIALKYL AMINOALKYL XANTHENE-9-CARBOXYLATES AND THE PRODUCTION THEREOF

John W. Cusic, Skokie, and Richard A. Robinson, Morton Grove, Ill., assignors to G. D. Searle & Co., Chicago, Ill., a corporation of Illinois No Drawing. Application May 10, 1952,
Serial No. 287,258

21 Claims. (Cl. 260—335)

This invention relates to quaternary salts of aminoalkyl esters of polynuclear carboxylic acids and to the preparation thereof. In particular this invention relates to quaternary ammonium salts of dialkylaminoalkyl esters of xanthene-9-carboxylic acids of the following general structural formula

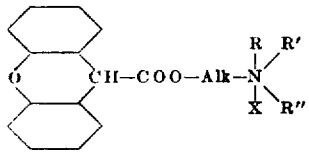

wherein Alk is a lower alkylene radical, R, R' and R'' are lower alkyl radicals, and X is one equivalent of an anion.

This application is a continuation-in-part of our copending application Serial No. 136,854, filed January 4, 1950, now abandoned.

In the compounds of the foregoing type, Alk represents a bivalent aliphatic radical derived from a saturated aliphatic hydrocarbon which may be straight- or branch-chained and which contains from 2 to 6 carbon atoms. Alk therefore represents radicals such as ethylene, propylene, butylene, and amylene radicals, as well as polymethylene radicals from three to six carbon atoms, including trimethylene, tetramethylene, pentamethylene and hexamethylene. The lower alkyl radicals represented by R, R' and R'' contain one to five carbon atoms and include methyl, ethyl, propyl, isopropyl, butyl, sec-butyl, tertbutyl, isobutyl, amyl, isoamyl and sec-amyl. X represents one equivalent of an anion such as chloride, bromide, iodide, methyl sulfate, ethyl sulfate, benzenesulfonate, toluenesulfonate, tartrate, succinate, malate, acetate, citrate, nitrate, sulfate, phosphate, and the like, which are nontoxic in therapeutic dosages.

The compounds of this invention are prepared by reacting a tertiary amino ester of the formula

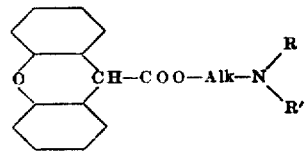

wherein all symbols have the meanings given hereinabove, with an ester of a strong organic or inorganic acid of the formula $$R''-X'$$

wherein R'' represents an alkyl radical and X' represents halogen, alkyl sulfate or arylsulfonate radicals. These reactions are preferably carried out at elevated temperatures in the range of 50–150° centigrade in inert solvents such as acetone, methyl ethyl ketone, lower alcohols, chloroform, and nitromethane. However, lower temperatures from 0° to 50° C. are also satisfactory. Generally these reactions are preferably carried out in a closed system if a lower alkyl halide is used as one of the reagents. In most instances the crystalline quaternary salt precipitates from the chilled reaction mixture and may be isolated by filtration and dried. In certain instances it is necessary to precipitate the salt by the addition of a solvent, such as ether or a low boiling aliphatic or aromatic hydrocarbon in order to lower the solubility of the salt in the selected solvent. The anion X', which represents halogen (chlorine, bromine or iodine), alkyl sulfate (methyl sulfate, ethyl sulfate or propyl sulfate) or arylsulfonate (benzenesulfonate or toluenesulfonate) radicals, may be replaced by X, one equivalent of another anion of the type disclosed above, by reaction with a heavy metal salt, such as silver acetate, silver citrate, silver tartrate, silver benzoate, lead acetate, lead benzoate, silver malate, silver nitrate and the like.

The compounds of this nivention are generally soluble in water or aqueous solutions of alcohols and other water soluble organic solvents. They exhibit surface-active properties and certain of them are useful as antiseptics and dispersing agents. They are also of value as medicinal agents, having sympatholytic and spasmolytic properties. The compounds of this invention are complete anticholinergic drugs, and have the property of blocking or inhibiting the transmission of nervous impulses across ganglia, parasympathetic myoneural junctions and skeletal myoneural junctions.

Our invention is disclosed in detail by the following examples which are representative of methods of preparing the compounds within the scope of this invention, but which are not to be construed as limiting the invention in spirit or scope. Relative amounts of materials are given in parts by weight, temperatures are given in degrees centigrade (° C.) and pressures in millimeters (mm.) of mercury. The organic acids in this application are named and numbered according to "The Ring Index" by Patterson and Capell, Reinhold Publishing Co., New York, N. Y., 1940.

Example 1

70 parts of β-diethylaminoethyl xanthene-9-carboxylate hydrochloride are dissolved in the minimum amount of water, reacted with an excess of concentrated sodium carbonate solution and the resulting base is extracted with ether, thoroughly dried, and evaporated. The residue of β-diethylaminoethyl xanthene-9-carboxylate is dissolved in 240 parts of anhydrous acetone and reacted with 22 parts of methyl chloride at 100° C. for two hours in a closed system. On chilling the reaction mixture precipitates crystals of β-diethylaminoethyl xanthene-9-carboxylate methochloride. This compound is hygroscopic. The crystals melt at about 162° C.

Example 2

17 parts of β-dimethylaminoethyl xanthene-9-carboxylate are dissolved in 80 parts of anhydrous acetone containing 14 parts of methyl chloride. Upon standing at room temperature the crystalline quaternary salt precipitates. It is removed by filtration and washed with butanone (methyl ethyl ketone). β-Dimethylaminoethyl xanthene-9-carboxylate methochloride melts at 130° C.

Example 3

20 parts of β-diethylaminoethyl xanthene-9-carboxylate hydrochloride are dissolved in a minimum amount of water, treated with an excess of concentrated caustic soda solution and the resulting suspension is extracted with ether. The ether extract is washed with water, dried, and filtered. To it is added an excess of methyl iodide and the resulting solution is kept at 0° C. for two days. The crystalline salt, β-diethylaminoethyl xanthene-9-carboxylate methiodide, is recrystallized from isopropanol and melts at 178–179° C.

Example 4

130 parts of β-diethylaminoethyl xanthene-9-carboxylate and 73 parts of methyl p-toluenesulfonate are dissolved in 400 parts of butanone. The solution is kept at about 0° C. for about 15 hours, during which time the quaternary ammonium salt crystallizes out. The salt is collected on a filter and washed with ether. It melts at 137–138° C. It has the formula

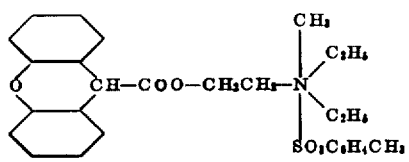

Example 5

β-Diethylaminoethyl xanthene-9-carboxylate methiodide is converted to the corresponding normal sulfate by mixing 1 mole of the quaternary ammonium iodide with 0.5 mole of silver sulfate in absolute methanol at room temperature. The silver iodide is removed by filtration and the filtrate is evaporated under vacuum. The resulting salt is obtained in an oily form and could not be induced to crystallize.

Example 6

β-Diethylaminoethyl xanthene-9-carboxylate methobromide is converted to the corresponding acetate by mixing 1 mole of the quaternary ammonium bromide with 0.5 mole of lead acetate in absolute methanol. The silver bromide is removed and the liquid is evaporated in vacuum. The acetate is an oily salt which did not crystallize.

Example 7

β-Diethylaminoethyl xanthene-9-carboxylate methobromide is converted to the corresponding acid tartrate by the reaction of 1 mole of the bromide with 0.5 mole of silver tartrate and 0.5 mole of tartaric acid in cold absolute methanol. The silver bromide is filtered off and the filtrate is evaporated under vacuum. The resulting salt is washed with ether and with butanone, but could not be induced to crystallize.

Example 8

210 parts of β-diethylaminoethyl xanthene-9-carboxylate methobromide, 87 parts of silver citrate, 63.3 parts of anhydrous citric acid and 1350 parts of methanol are mixed and agitated at room temperature for about one hour. The precipitate of silver bromide is removed by filtration and the filtrate is evaporated under vacuum at room temperature or below. The oily residue of the dihydrogen citrate salt is washed with ether and then covered with dioxane. It crystallizes in a short time and then is broken up and washed with dioxane and with isopropanol. It is dried at 70–80° C. and forms white crystals melting at 96–98° C. The yield is 265 parts, which is essentially quantitative. The salt is difficulty soluble in acetone, isopropanol and butanone.

Example 9

215 parts of β-diethylaminoethyl xanthene-9-carboxylate methobromide and 38 parts of tartaric acid are dissolved in 1900 parts of methanol at room temperature. To the solution are added 91 parts of silver tartrate and the suspension is agitated at room temperature for 15 minutes. The silver bromide is removed by filtration and the filtrate is evaporated under vacuum. The residue of the acid tartrate salt is washed several times with ether and dried in a vacuum desiccator at 25° C. It is a powdery white solid which is hygroscopic and which could not be recrystallized.

Example 10

β-Diethylaminoethyl xanthene-9-carboxylate methobromide is converted to the corresponding acid malate by reaction of 1 mole of the bromide with 0.5 mole of silver malate and 0.5 mole of malic acid in methanol at room temperature. The silver bromide is filtered off and the solution of the malate salt is evaporated under vacuum. It is a hygroscopic powder which could not be obtained in pure crystalline form.

Example 11

234 parts of β-diethylaminoethyl xanthene-9-carboxylate methiodide and 85 parts of silver nitrate are mixed and agitated in 1000 parts of absolute methanol for one hour at room temperature. The silver iodide is filtered off and the filtrate is evaporated under vacuum. The residue of β-diethylaminoethyl xanthene-9-carboxylate nitrate is washed with ether and with butanone and dried at 70–80° C. It melts at 142–143° C.

Example 12

82 parts of β-diethylaminoethyl xanthene-9-carboxylate are dissolved in 125 parts of butanone. To this solution methyl bromide gas is passed in until 25 parts are taken up. The solution becomes warm as the addition of methyl bromide is made, and the quaternary ammonium salt begins to precipitate. The reaction mixture is heated at 75° C. in a closed vessel for 18 hours. Then the salt is collected on a filter, washed with butanone and dried. The yield is 95%. The β-diethylaminoethyl xanthene-9-carboxylate methobromide so obtained melts at 173–176° C.

In a run similar to the above where the reaction mixture is kept at room temperature for 18 hours, instead of at 75° C., a yield of 93% of the same salt, melting at 176–178° C. after two washings with butanone, was obtained.

This salt may be obtained with a melting point of 180–182° C. by solution in hot ethanol, treatment with activated charcoal, filtration, evaporation and finally washing of the salt with cold butanone followed by drying.

Example 13

A solution of 339 parts of β-diethylaminoethyl xanthene-9-carboxylate and 126 parts of dimethyl sulfate in 4000 parts of butanone is refluxed for 3 hours. On cooling, no precipitate forms. The solution is evaporated under vacuum and the residue of β-diethylaminoethyl xanthene-9-carboxylate methosulfate is washed with cold isopropanol. It soon crystallizes and is broken up, washed with isopropanol and dried. It melts at about 114–118° C. It has the formula

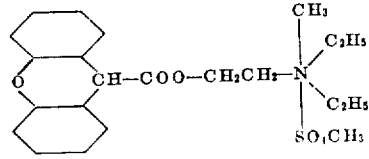

Example 14

452 parts of xanthene-9-carboxylic acid and 350 parts of thionyl chloride in 1500 parts of benzene are refluxed for 4 hours. The excess of thionyl chloride and part of the benzene are distilled off while dry toluene is slowly added. The solution, after removal of thionyl chloride, is treated with active carbon and filtered. A solution of 262 parts of 1-diethylamino-2-propanol in 1000 parts of dry benzene is added and the resulting mixture is refluxed for one hour. The mixture is cooled and the precipitate separated by decantation. After recrystallization from butanone β-diethylamino-α-methylethyl xanthene-9-carboxylate hydrochloride thus obtained melts at 155–156° C.

The foregoing salt is dissolved in water and treated with concentrated potassium carbonate solution. The basic ester is extracted with ether and the extract is dried and evaporated. 9 parts of β-diethylamino-α-methyl ethyl xanthene-9-carboxylate thus obtained and 22 parts of methyl iodide are dissolved in 40 parts of butanone and the solution is kept at about 5° C. for 16 hours. Then dry ether is added and the precipitate of the quaternary salt soon crystallizes. This is removed and recrystallized from isopropanol. β-Diethylamino-α-methylethyl xanthene-9-carboxylate methiodide so obtained melts at 154–155° C.

9 parts of β-diethylamino-α-methylethyl xanthene-9-carboxylate and 20 parts of methyl bromide in 40 parts of butanone are heated at 80° C. in a closed vessel for one hour. On cooling a crystalline precipitate of β-diethylamino-α-methylethyl xanthene-9-carboxylate methobromide forms. This salt melts at 139–143° C. after recrystallization from butanone. It has the formula

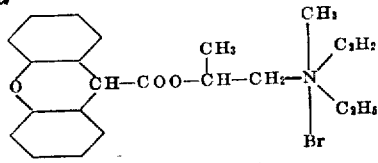

Example 15

365 parts of β-diisopropylaminoethyl chloride and 565 parts of xanthene-9-carboxylic acid dissolved in 800 parts of isopropanol is heated to reflux for 5 hours. The solution is then cooled, diluted with dry ether and the crystalline precipitate of β-diisopropylaminoethyl xanthene-9-carboxylate hydrochloride is collected on a filter and dried. This salt melts at 111–112° C. 38 parts of the foregoing salt are dissolved in the minimum of water and treated with an aqueous solution of potassium carbonate. The suspension of β-diisopropylaminoethyl xanthene-9-carboxylate thus formed is extracted with ether and the ether extract is dried and evaporated. There is thus obtained 33 parts of the free base which are treated with 10 parts of methyl bromide in 100 parts of chloroform for 22 hours at 70–80° C. The reaction mixture is chilled, diluted with anhydrous ether and the quaternary salt thus precipitated is collected on a filter and washed with dry ether and then with butanone. β-Diisopropylaminoethyl xanthene-9-carboxylate methobromide thus obtained melts at 152–153° C. After recrystallization from isopropanol it melts at 157–158° C.

Example 16

A solution of 560 parts of xanthene-9-carboxylic acid and 415 parts β-(sec-butyl-ethylamino) ethyl chloride (B. P. 59° C. at 8 mm.) in 2200 parts of chloroform is heated at 90–95° C. for 3 hours in a closed vessel. The chloroform is distilled off at 90–95° C. over a period of 1.5 hours and then traces are removed at 90° C. and at reduced pressure (10 mm.). The residue of β-(sec-butyl-ethylamino)-ethyl xanthene-9-carboxylate hydrochloride is dissolved in water and treated with an excess of potassium carbonate solution. The free basic ester is extracted with benzene and the extract is dried and evaporated.

79 parts of β-(sec-butyl-ethylamino) ethyl xanthene-9-carboxylate are dissolved in 300 parts of chloroform and the chilled solution is treated with 40 parts of methyl bromide. The reaction mixture is kept at room temperature for 16 hours, then filtered and diluted with dry ether. On chilling and standing a precipitate of β-(sec-butyl-ethylamino) ethyl xanthene-9-carboxylate methobromide forms. This is removed, washed with a mixture of ether and chloroform and dried. After digestion with butanone at 80° C. it melts at 131–132° C. It has the formula

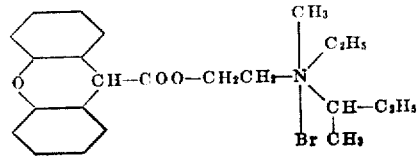

Example 17

69 parts of β-(isopropylethylamino)ethyl xanthene-9-carboxylate hydrochloride are converted to the free ester as in Example 16. 50 parts of β-(isopropylethylamino)ethyl xanthene-9-carboxylate and 20 parts of methyl bromide are dissolved in 220 parts of chloroform and heated to 100° C. for 3½ hours in a closed vessel. After chilling the quaternary salt is precipitated by addition of anhydrous ether. It is dissolved in hot isopropanol, filtered, cooled and treated with anhydrous ether until turbid. On standing crystals of β-(isopropylethylamino)ethyl xanthene-9-carboxylate methobromide crystallize out. This salt melts at 178-179° C. It has the formula

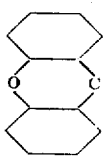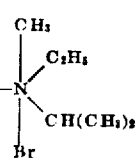

Example 18

49 parts of xanthene-9-carboxylic acid and 30 parts of β-(isopropylmethylamino)ethyl chloride are dissolved in a mixture of 65 parts of toluene and 60 parts of isopropanol and refluxed for 2 hours. The reaction mixture is diluted with 700 parts of ether and extracted with water. The aqueous extract containing β-(isopropylmethylamino)ethyl xanthene-9-carboxylate hydrochloride (M. P. 105-106° C.) is washed with benzene and with ether and then made alkaline with concentrated potassium carbonate solution. The β-(isopropylmethylamino)ethyl xanthene-9-carboxylate is extracted with ether. The ether extract is dried and evaporated. 30 parts of the free basic ester thus obtained and 30 parts of methyl bromide in 80 parts of butanone are mixed and the quaternary salt forms almost immediately. After 30 minutes the reaction mixture is filtered and the precipitate of β-(isopropylmethylamino)ethyl xanthene - 9 - carboxylate methobromide is washed with anhydrous ether and butanone. After recrystallization from isopropanol this salt melts at about 188° C.

Example 19

7 parts of β-diisopropylaminoethanol ethochloride and 10 parts of xanthene-9-carboxylic acid chloride are mixed and warmed to 80-90° C. for one hour with stirring. The reaction mixture is cooled, washed well with ether, dissolved in butanone and filtered. 5 parts of sodium iodide in acetone are added to the filtrate and β-diisopropylaminoethyl xanthene-9-carboxylate ethiodide precipitates. This salt is removed, washed with butanone and with acetone, and recrystallized from a mixture of chloroform and ether and from isopropanol. It forms white crystals melting at 148-149° C.

9 parts of β-diisopropylaminoethyl xanthene-9-carboxylate ethiodide are dissolved in water. 5 parts of silver nitrate are converted to silver bromide and the silver bromide is added to the methanol solution. The resulting suspension is agitated for one hour and then treated with activated charcoal and filtered. The filtrate is again treated with silver bromide prepared from 5 parts of silver nitrate and agitated for an additional hour. Activated carbon is added and the mixture is filtered. The filtrate is evaporated to dryness under vacuum. The residue of β-diisopropylaminoethyl xanthene-9-carboxylate ethobromide is washed with butanone, filtered and dried. After recrystallization from isopropanol-ether this product melts at 153-154° C.

Example 20

15 parts of xanthene-9-carboxylic acid chloride and 10 parts of β-(isopropylethylamino)ethanol ethochloride are mixed and warmed to 80-90° C. for 1 hour with occasional stirring. The reaction mixture is cooled, washed with ether, and dissolved in butanone. The butanone solution is treated with dry ether to precipitate β-(isopropylethylamino)ethyl xanthene-9-carboxylate ethochloride. This salt is dissolved in water, neutralized with potassium carbonate solution, and evaporated to dryness at 25° C. under vacuum. The residue is recrystallized from a mixture of chloroform and ether. The product thus obtained is triturated with butanone and recrystallized from a mixture of butanone and acetone. β-(Isopropylethylamino)ethyl xanthene-9-carboxylate ethochloride thus obtained is very hygroscopic. A sample on analysis showed 8.13% chlorine; calculated value is 8.78%. This salt has the formula

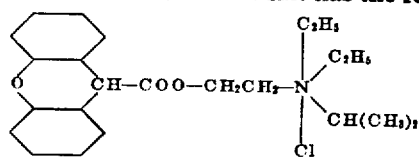

Example 21

15 parts of β-diethylaminoethyl xanthene-9-carboxylate and 15 parts of n-propyl iodide in 40 parts of butanone are refluxed for 5 hours. On cooling a heavy precipitate forms immediately. The reaction mixture is diluted with isopropanol to aid filtration and the quaternary ammonium salt is collected on a filter, washed with a mixture of isopropanol and butanone and dried. The salt thus obtained melts at 124-125° C. and has the formula

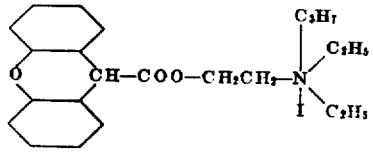

Example 22

A solution of 15 parts of γ-diethylaminopropyl xanthene-9-carboxylate and 15 parts of methyl bromide in 40 parts of butanone is allowed to stand at 5° C. for two days. A heavy crystalline precipitate of the quaternary ammonium salt forms very rapidly. This is collected on a filter and recrystallized from isopropanol. γ-Diethylaminopropyl xanthene-9-carboxylate methobromide thus obtained melts at 186-187° C. It has the formula

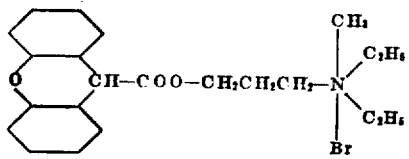

Example 23

A solution of 15 parts of β-diethylaminoethyl xanthene-9-carboxylate and 20 parts of ethyl bromide in 40 parts of butanone is heated in a closed vessel for 16 hours at 80° C. The precipitate of the quaternary ammonium salt thus formed is collected on a filter and then recrystallized from isopropanol. β-Diethylaminoethyl xanthene-9-carboxylate ethobromide thus obtained melts at 195–196° C.

Example 24

24 parts of β-diethylaminoethyl xanthene-9-carboxylate and 25 parts of n-butyl bromide are dissolved in 80 parts of butanone and refluxed for 40 hours. The reaction mixture is cooled and treated with anhydrous ether. The precipitate of the quaternary ammonium salt soon crystallizes. After recrystallization from a mixture of isopropanol and ether it melts at 117–118° C. It has the formula

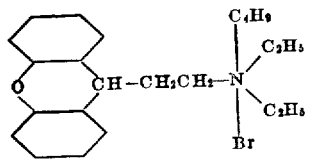

Example 25

A solution of 25 parts of γ-diethylaminopropyl xanthene-9-carboxylate and 35 parts of ethyl bromide in 60 parts of butanone is heated for four days at 80° C. in a closed vessel. The reaction mixture is thoroughly chilled and the precipitate of the quaternary ammonium salt is collected on a filter and dried. After recrystallization from a mixture of isopropanol and ether γ-diethylaminopropyl xanthene-9-carboxylate ethobromide melts at 123–124° C.

Example 26

A solution of 113 parts of xanthene-9-carboxylic acid and 75 parts of thionyl chloride in 400 parts of dry toluene is refluxed for 3 hours. Then the excess of thionyl chloride and about half of the toluene is removed by distillation. The residual solution is treated with active carbon and filtered. To it is added a solution of 262 parts of 2-diethylamino-1-propanol in 800 parts of dry toluene. This solution is refluxed for 3 hours, then left at room temperature for 48 hours. The precipitate of β-diethylaminopropyl xanthene-9-carboxylate hydrochloride is separated by decantation, dissolved in warm water, filtered and made alkaline. The basic ester is extracted with ether and the extract is dried and evaporated. β-Diethylaminopropyl xanthene-9-carboxylate forms a crystalline hydrochloride melting at 155–156° C.

15 parts of β-diethylaminopropyl xanthene-9-carboxylate and 30 parts of methyl iodide in 40 parts of butanone is heated for 16 hours at 80° C. in a closed vessel. The reaction mixture is cooled and diluted with ether. The precipitate of the quaternary salt is removed and recrystallized from isopropanol. β-Diethylaminopropyl xanthene-9-carboxylate methiodide thus obtained melts at 149–150° C. It has the formula

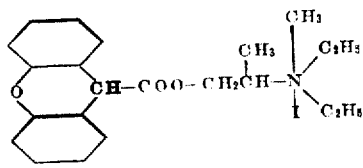

Example 27

17 parts of β-dimethylaminopropyl xanthene-9-carboxylate and 10 parts of methyl bromide in 40 parts of butanone are allowed to stand at room temperature for 16 hours. The crystalline precipitate is removed and recrystallized from isopropanol. β-Dimethylaminopropyl xanthene-9-carboxylate methobromide thus obtained melts at 175–177° C. It has the formula

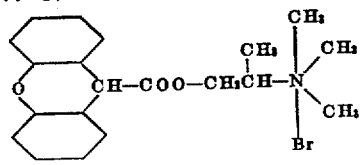

Example 28

A solution of 366 parts of xanthene-9-carboxylic acid chloride and 217 parts of β-di-n-propylaminoethanol in 2400 parts of butanone is refluxed for 16 hours. Anhydrous ether is added and the reaction mixture is chilled for 48 hours during which time a heavy crystalline precipitate of β-di-n-propylaminoethyl xanthene-9-carboxylate hydrochloride forms. This salt melts at 120–122° C. The free base is obtained by dissolving the foregoing salt in water and treating it with a concentrated solution of potassium carbonate. The free base is extracted with ether and the ether solution is dried and evaporated. 24 parts of β-di-n-propylaminoethyl xanthene-9-carboxylate thus obtained and 26 parts of methyl bromide in 75 parts of chloroform are heated at 80° C. in a closed vessel for 16 hours. The resulting solution is evaporated and the residue is treated with anhydrous ether. A crystalline precipitate of β-di-n-propylaminoethyl xanthene-9-carboxylate methobromide soon forms. This is recrystallized from a mixture of isopropanol and ethyl acetate and melts at 155–156° C.

Example 29

A solution of 244 parts of xanthene-9-carboxylic acid chloride and 172 parts of β-di-n-butylaminoethanol in 1600 parts of butanone is refluxed for 16 hours. Dry ether is added and an oily precipitate forms. This is separated by decantation and 100 parts of xanthene-9-carboxylic acid chloride are added with 880 parts of dry benzene. The resulting solution is heated to reflux for 10 hours and then evaporated to dryness. The residue of β-di-n-butylaminoethyl xanthene-9-carboxylate hydrochloride is dissolved in water and treated with an excess of concentrated potassium carbonate solution. The free base is extracted with ether and the ether extract is dried and evaporated. 22 parts of β-di-n-butylaminoethyl xanthene-9-carboxylate thus obtained are dissolved in 75 parts of chloroform and 22 parts of methyl bromide are added to the solution. The resulting solution is heated at 80° C. for 4 hours in a closed vessel. The reaction mixture is then evaporated on the steam bath to remove chloroform. The residue is cooled and treated with dry ether. The crystalline precipitate of β-di-n-butylaminoethyl xanthene-9-carboxylate methobromide is recrystallized from isopropanol and melts at 163–164° C.

Example 30

To a warm solution of 140 parts of xanthene-9-carboxylic acid in 500 parts of isopropanol are added 84 parts of δ-dimethylaminobutyl chloride and the solution is refluxed for 6 hours. Most of the solvent is removed by evaporation on a steam bath and residue of δ-dimethylaminobutyl xanthene-9-carboxylate hydrochloride is taken up in 500 parts of dilute hydrochloric acid. The solution is washed twice with ether, then made alkaline with saturated potassium carbonate solution. The basic ester is extracted with ether and the extract is washed with water, dried with anhydrous sodium sulfate, filtered and evaporated. There is obtained as a light-colored viscous oil a residue of δ-dimethylaminobutyl xanthene-9-carboxylate.

25 parts of δ-dimethylaminobutyl xanthene-9-carboxylate are dissolved in 120 parts of butanone and treated with 50 parts of ethyl chloride. The solution is kept at 65–70° C. in a closed vessel for 18 hours. The solvent is removed by evaporation and the residue of δ-dimethylaminobutyl xanthene-9-carboxylate ethochloride is triturated with dry ether and dried. A sample on analysis showed 9.01% chlorine; the calculated value is 9.09%. The salt has the formula

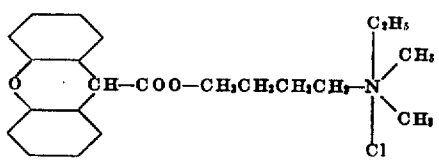

We claim:

1. A quaternary ammonium salt of an aminoalkyl ester of xanthene-9-carboxylic acid, said salt having the formula

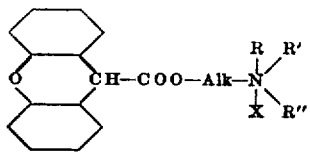

wherein Alk is a lower alkylene radical, R, R' and R'' are lower alkyl radicals and X is one equivalent of an anion.

2. A quaternary ammonium salt of an aminoethyl ester of xanthene-9-carboxylic acid, said salt having the formula

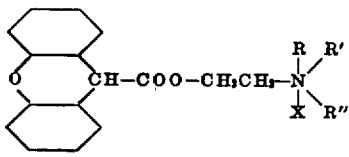

wherein R, R' and R'' are lower alkyl radicals and X is one equivalent of an anion.

3. A quaternary ammonium salt of β-diethylaminoethyl xanthene-9-carboxylate, said salt having the formula

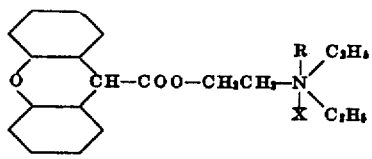

wherein R is a lower alkyl radical and X is one equivalent of an anion.

4. A quaternary ammonium salt of β-diethylaminoethyl xanthene-9-carboxylate, said salt having the formula

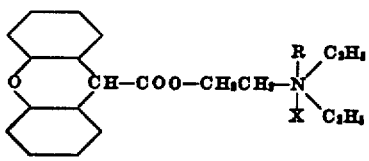

wherein R is a lower alkyl radical and X is a halogen.

5. A quaternary ammonium salt of β-diethylaminoethyl xanthene-9-carboxylate, said salt having the formula

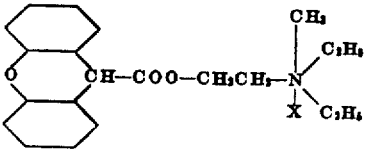

wherein X is a halogen.

6. β-Diethylaminoethyl xanthene-9-carboxylate methobromide.

7. β-Diethylaminoethyl xanthene-9-carboxylate methochloride.

8. A quaternary ammonium salt of β-diisopropylaminoethyl xanthene-9-carboxylate, said salt having the formula

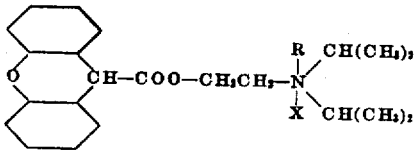

wherein R is a lower alkyl radical and X is one equivalent of an anion.

9. A quaternary ammonium salt of β-diisopropylaminoethyl xanthene-9-carboxylate, said salt having the formula

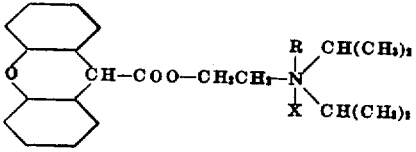

wherein R is a lower alkyl radical and X is a halogen.

10. A quaternary ammonium salt of β-diisopropylaminoethyl xanthene-9-carboxylate, said salt having the formula

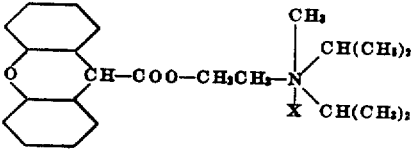

wherein X is a halogen.

11. β-Diisopropylaminoethyl xanthene-9-carboxylate methobromide.

12. A quaternary ammonium salt of β-diethylaminoethyl xanthene-9-carboxylate, said salt having the formula

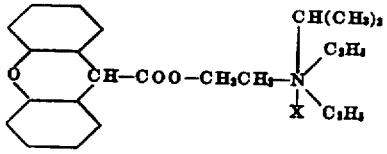

wherein X is a halogen.

13. β-(Isopropylethylamino)ethyl xanthene-9-carboxylate ethochloride.

14. A quaternary ammonium salt of β-(isopropylethylamino)ethyl xanthene-9-carboxylate, said salt having the formula

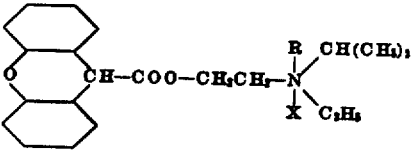

wherein R is a lower alkyl radical and X is a halogen.

15. A methohalide of β-(isopropylethylamino)-ethyl xanthene-9-carboxylate.

16. β-(Isopropylethylamino)ethyl xanthene-9-carboxylate methobromide.

17. The process of producing a quaternary ammonium salt of an aminoalkyl ester of xanthene-9-carboxylic acid of the formula

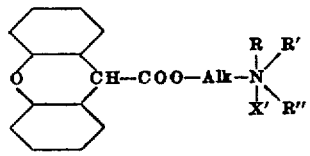

wherein Alk is a lower alkylene radical, R, R' and R'' are lower alkyl radicals and X' is a member of the class consisting of halogen, alkyl sulfate and arylsulfonate radicals, which comprises reacting a basic ester of the formula

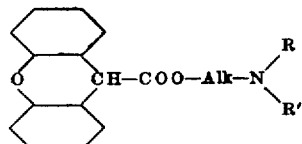

with a reactive ester of the formula

wherein all symbols have the meanings defined above, in an inert solvent and separating the quaternary ammonium salt thus formed.

18. The process of producing a quaternary ammonium salt of β-diethylaminoethyl xanthene-9-carboxylate of the formula

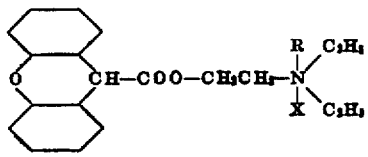

wherein R is a lower alkyl radical and X is a halogen, which comprises reacting β-diethylaminoethyl xanthene-9-carboxylate with a lower alkyl halide in an inert solvent and separating the salt thus formed.

19. The process of producing β-diethylaminoethyl xanthene-9-carboxylate methobromide which comprises reacting β-diethylaminoethyl xanthene-9-carboxylate with methyl bromide in an inert solvent and separating the salt thus formed.

20. The process of producing a quaternary ammonium salt of β-diisopropylaminoethyl xanthene-9-carboxylate of the formula

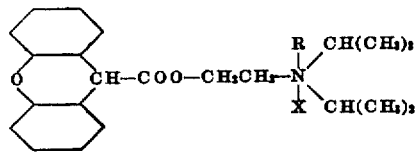

wherein R is a lower alkyl radical and X is a halogen, which comprises reacting β-diisopropylaminoethyl xanthene-9-carboxylate with a lower alkyl halide in an inert solvent and separating the salt thus formed.

21. The process of producing β-diisopropylaminoethyl xanthene-9-carboxylate methobromide which comprises reacting β-diisopropylaminoethyl xanthene-9-carboxylate with methyl bromide in an inert solvent and separating the salt thus formed.

JOHN W. CUSIC.
RICHARD A. ROBINSON.

References Cited in the file of this patent

UNITED STATES PATENTS

| Number | Name | Date |
| --- | --- | --- |
| 2,334,310 | Burtner | Nov. 16, 1943 |
| 2,423,025 | Holmes | June 24, 1947 |

---

Certificate of Correction

Patent No. 2,659,732            November 17, 1953

John W. Cusic et al.

It is hereby certified that error appears in the printed specification of the above numbered patent requiring correction as follows:

Column 2, line 34, for "nivention" read *invention*; column 4, line 37, for "difficulty" read *difficultly*; column 6, lines 11 and 12, right-hand portion of the formula, for /C₃H₃    read    /C₂H₅ column 8, line 21, for "Isopropy-" read *Isopropyl-*;

and that the said Letters Patent should be read as corrected above, so that the same may conform to the record of the case in the Patent Office.

Signed and sealed this 19th day of January, A. D. 1954.

[SEAL]

ARTHUR W. CROCKER,
*Assistant Commissioner of Patents.*

15. A methohalide of β-(isopropylethylamino)-ethyl xanthene-9-carboxylate.

16. β-(Isopropylethylamino)ethyl xanthene-9-carboxylate methobromide.

17. The process of producing a quaternary ammonium salt of an aminoalkyl ester of xanthene-9-carboxylic acid of the formula

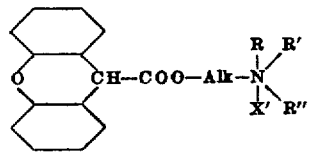

wherein Alk is a lower alkylene radical, R, R' and R" are lower alkyl radicals and X' is a member of the class consisting of halogen, alkyl sulfate and arylsulfonate radicals, which comprises reacting a basic ester of the formula

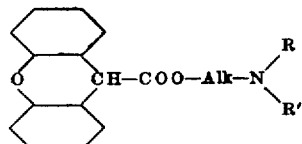

with a reactive ester of the formula

wherein all symbols have the meanings defined above, in an inert solvent and separating the quaternary ammonium salt thus formed.

18. The process of producing a quaternary ammonium salt of β-diethylaminoethyl xanthene-9-carboxylate of the formula

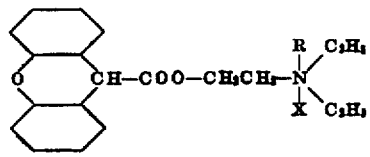

wherein R is a lower alkyl radical and X is a halogen, which comprises reacting β-diethylaminoethyl xanthene-9-carboxylate with a lower alkyl halide in an inert solvent and separating the salt thus formed.

19. The process of producing β-diethylaminoethyl xanthene-9-carboxylate methobromide which comprises reacting β-diethylaminoethyl xanthene-9-carboxylate with methyl bromide in an inert solvent and separating the salt thus formed.

20. The process of producing a quaternary ammonium salt of β-diisopropylaminoethyl xanthene-9-carboxylate of the formula

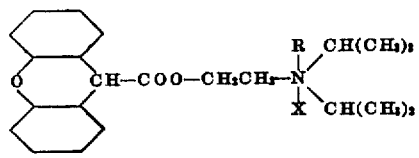

wherein R is a lower alkyl radical and X is a halogen, which comprises reacting β-diisopropylaminoethyl xanthene-9-carboxylate with a lower alkyl halide in an inert solvent and separating the salt thus formed.

21. The process of producing β-diisopropylaminoethyl xanthene-9-carboxylate methobromide which comprises reacting β-diisopropylaminoethyl xanthene-9-carboxylate with methyl bromide in an inert solvent and separating the salt thus formed.

JOHN W. CUSIC.
RICHARD A. ROBINSON.

References Cited in the file of this patent

UNITED STATES PATENTS

| Number    | Name    | Date          |
|-----------|---------|---------------|
| 2,334,310 | Burtner | Nov. 16, 1943 |
| 2,423,025 | Holmes  | June 24, 1947 |

---

Certificate of Correction

Patent No. 2,659,732 — November 17, 1953

John W. Cusic et al.

It is hereby certified that error appears in the printed specification of the above numbered patent requiring correction as follows:

Column 2, line 34, for "nivention" read *invention*; column 4, line 37, for "difficulty" read *difficultly*; column 6, lines 11 and 12, right-hand portion of the formula, for $$/ C_3H_3 \quad \text{read} \quad / C_2H_5$$

column 8, line 21, for "Isopropy-" read *Isopropyl-*;

and that the said Letters Patent should be read as corrected above, so that the same may conform to the record of the case in the Patent Office.

Signed and sealed this 19th day of January, A. D. 1954.

[SEAL]

ARTHUR W. CROCKER,
*Assistant Commissioner of Patents.*

Certificate of Correction

Patent No. 2,659,732                                                    November 17, 1953

John W. Cusic et al.

It is hereby certified that error appears in the printed specification of the above numbered patent requiring correction as follows:

Column 2, line 34, for "nivention" read *invention*; column 4, line 37, for "difficulty" read *difficultly*; column 6, lines 11 and 12, right-hand portion of the formula, for $$\diagup^{O_3H_5} \quad \text{read} \quad \diagup^{C_3H_5}$$

column 8, line 21, for "Isopropy-" read *Isopropyl-*;

and that the said Letters Patent should be read as corrected above, so that the same may conform to the record of the case in the Patent Office.

Signed and sealed this 19th day of January, A. D. 1954.

[SEAL]

ARTHUR W. CROCKER,
*Assistant Commissioner of Patents.*